(12) United States Patent
McNamara et al.

(10) Patent No.: US 12,441,841 B2
(45) Date of Patent: Oct. 14, 2025

(54) OPTICALLY TRANSPARENT POLYIMIDES

(71) Applicant: Akron Polymer Systems, Inc., Akron, OH (US)

(72) Inventors: John McNamara, El Sobrante, CA (US); John D. Harvey, Akron, OH (US); Matthew J. Graham, Akron, OH (US); Carolyn Scherger, Akron, OH (US)

(73) Assignee: Akron Polymer Systems, Inc., Akron, OH (US)

(*) Notice: Subject to any disclaimer, the term of this patent is extended or adjusted under 35 U.S.C. 154(b) by 431 days.

(21) Appl. No.: 16/652,541

(22) PCT Filed: Oct. 3, 2018

(86) PCT No.: PCT/US2018/054260
§ 371 (c)(1),
(2) Date: Mar. 31, 2020

(87) PCT Pub. No.: WO2019/156717
PCT Pub. Date: Aug. 15, 2019

(65) Prior Publication Data
US 2020/0239635 A1 Jul. 30, 2020

Related U.S. Application Data

(60) Provisional application No. 62/568,745, filed on Oct. 5, 2017.

(51) Int. Cl.
*C08G 73/10* (2006.01)
*C08L 79/08* (2006.01)
*C12P 13/00* (2006.01)

(52) U.S. Cl.
CPC ..... *C08G 73/1007* (2013.01); *C08G 73/1082* (2013.01); *C08L 79/08* (2013.01); *C12P 13/001* (2013.01); *C08G 2150/00* (2013.01); *C08G 2170/00* (2013.01); *C08L 2203/12* (2013.01); *C08L 2203/16* (2013.01); *C08L 2203/20* (2013.01); *C08L 2310/00* (2013.01)

(58) Field of Classification Search
CPC . C08G 73/1082; C08G 73/1042; C08L 79/08; C08J 2379/00
See application file for complete search history.

(56) References Cited

U.S. PATENT DOCUMENTS

| | | | |
|---|---|---|---|
| 5,280,101 A * | 1/1994 | Koning | C08G 73/1042 528/229 |
| 5,420,233 A | 5/1995 | Isogai et al. | |
| 6,790,930 B1 | 9/2004 | Kikuchi et al. | |
| 7,659,097 B2 | 2/2010 | Renninger et al. | |
| 11,407,868 B2 | 8/2022 | Nakayama | |
| 2009/0082543 A1 | 3/2009 | Ueda | |
| 2009/0203102 A1 | 8/2009 | Cervin et al. | |
| 2009/0282545 A1 | 11/2009 | Eichelberger et al. | |
| 2010/0003716 A1 | 1/2010 | Cervin | |
| 2010/0048964 A1 | 2/2010 | Calabria et al. | |
| 2010/0297749 A1 | 11/2010 | Aravanis et al. | |
| 2011/0045563 A1 | 2/2011 | Melis | |
| 2013/0178597 A1 | 7/2013 | Takasawa et al. | |
| 2014/0068797 A1 | 3/2014 | Doudna et al. | |
| 2014/0155526 A1 | 6/2014 | Fujibayashi | |
| 2014/0315985 A1 | 10/2014 | May et al. | |

FOREIGN PATENT DOCUMENTS

| | | | |
|---|---|---|---|
| CN | 107602859 | * | 1/2018 |
| CN | 107602859 A | | 1/2018 |
| EP | 675986 B1 | | 12/1993 |
| EP | 1260538 B1 | | 12/2010 |
| JP | 10310639 A | | 11/1998 |
| JP | 2003176354 A | | 6/2003 |
| JP | 2004290091 A | | 10/2004 |
| JP | 200845054 A | | 2/2008 |
| JP | 2008120869 A | | 5/2008 |
| JP | 4802934 | * | 10/2011 |
| JP | 20120212003 A2 | | 11/2012 |
| JP | 2013023583 A | | 2/2013 |
| JP | 5195133 B2 | | 5/2013 |
| JP | 2013-144752 A1 | | 7/2013 |
| JP | 2014108994 A | | 6/2014 |
| JP | 5962141 | * | 8/2016 |
| KR | 20160033009 A | | 3/2016 |
| WO | 2004033646 A1 | | 4/2004 |
| WO | 2009076676 A2 | | 6/2009 |
| WO | 2009132220 A2 | | 10/2009 |
| WO | 2010003007 A2 | | 1/2010 |

(Continued)

OTHER PUBLICATIONS

Odian (Principles of Polymerization, Wiley-Interscience, 2004) p. 74.*
CN 107602859 machine translation (2018).*
Gee et al.(KR 20120033867), English translation. published on 2010-09-30.*
Wataru et al.(WO 2011033751), English translation published on 2011-03-24.*
Choi, Hyang et al., "Rational design of ornithine decarboxylase with high catalytic activity for the production of putrescine", Appl Microbiol Biotechnol, 2014, DOI 10.1007/s00253-014-5669-8.
Delano, C.B., "Development of an impact- and solvent-resistant thermoplastic composite matrix—phase IV", NASA Contractor Report 178413, 1987.

(Continued)

*Primary Examiner* — Gregory Listvoyb
(74) *Attorney, Agent, or Firm* — Benesch Friedlander Coplan & Aronoff LLP

(57) ABSTRACT

The present disclosure provides novel polyimides having a high aliphatic monomer-content and improved optical properties and solubility relative to conventional polyimides. Also provided are methods of making the polyimides, articles of manufacture incorporating the polyimides and methods for making these, as well as methods of using the polyimides.

13 Claims, 6 Drawing Sheets

(56) References Cited

FOREIGN PATENT DOCUMENTS

| WO | 20100048964 A2 | 5/2010 | |
|---|---|---|---|
| WO | 2011034863 A1 | 3/2011 | |
| WO | WO-2014073591 A1 * | 5/2014 | ........... B32B 17/064 |
| WO | 2016032299 A1 | 3/2016 | |

OTHER PUBLICATIONS

Jarzabek, B. et al., "Optical properties of new aliphatic-aromatic co-polimides", Journal of Non-Crystalline Solids, 2002, pp. 1057-1061, vol. 299-302, North-Holland Physics Publishing, Amsterdam, NL.

Tanaka, K. et al., "Anomalous temperature dependence of lifetime of ortho-positronium in polyimides", Radiation Physics and Chemistry, 1999, vol. 55, No. 4, pp. 417-422, p. 419, figure 1, table 1.

Zhu, S.-Z et al., "A new synthetic route of 4, 4'-hexafluoroisopropylidene-2, 2-bis-(phthalic acid anhydride) and characterization of 4, 4'-hexafluoroisopropylidene-2, 2-bis-(phthalic acid anhydride)-containing polyimides", Journal of Fluorine Chemistry, 2003, vol. 123, No. 2, pp. 221-225, p. 222, scheme 3.

International Search Report and Written Opinion for PCT/US2018/054260, mailed Sep. 6, 2019, 14 pages.

* cited by examiner

OPTICALLY TRANSPARENT POLYIMIDES

CROSS-REFERENCE TO RELATED APPLICATIONS

This application is a 371 U.S. National Phase of International application no. PCT/US2018/054260, filed on Oct. 3, 2018, which claims the benefit of U.S. provisional application No. 62/568,745, filed Oct. 5, 2017, each of which is hereby incorporated by reference in its entirety.

STATEMENT AS TO RIGHTS TO INVENTIONS MADE UNDER FEDERALLY SPONSORED RESEARCH AND DEVELOPMENT

This invention was made with Government support under Agreement No. HR0011-15-9-0014, awarded by DARPA. The Government has certain rights in the invention.

FIELD OF THE DISCLOSURE

The present disclosure relates generally to clear and optically transparent polyimides made up of aliphatic polyamines and dianhydrides.

BACKGROUND

The vast majority of conventional polyimides are highly colored materials with diminished optical clarity in the UV-Visible spectrum. As a result, such polyimides are undesirable as optical materials for applications involving optical waveguides in optical communications and optical computing and as flexible substrates or as components for organic light-emitting diode (OLED) and active-matrix liquid-crystal (AM-LCD) displays. Another limitation of these polyimides is they are unsuitable as transparent substrates for UV-cured coatings and adhesives because their UV absorbance interferes with the efficiency of the photoinitiators used for UV-cured coatings and adhesives.

Another limitation of such polyimides is that they are highly rigid polymers and therefore relatively insoluble. This limitation requires solution-processing as the polyamic acid polyimide precursor into a polymer material, such as a film. The polymer material is then thermally converted into the insoluble polyimide at temperatures in excess of 200° C. This high-temperature conversion prevents incorporation of these polyimides into state-of-the art applications, such as flexible electronics, flexible-hydride electronics, flexible circuits, and wearable electronics, all of which use low-temperature processing.

SUMMARY

Various embodiments contemplated herein may include, but are not limited to, one or more of the following:

Embodiment 1

A polyimide derived from monomers including: one or more aliphatic polyamines; and one or more aliphatic dianhydrides or tetracarboxylic acids thereof, one or more aromatic dianhydrides or tetraacids thereof, or a mixture thereof, wherein the one or more aliphatic dianhydrides or tetracarboxylic acids thereof are selected from the group consisting of 2,3,4,5-tetrahydrofurantetracarboxylic dianhydride; 5-(2,5-dioxotetrahydrofural)-3-methyl-3-cyclohexane-1,2-dicarboxylic dianhydride; 1,2,4,5-cyclohexanetetracarboxylic acid dianhydride (H-PMDA); 3,4-dicarboxy-1,2,3,4-tetrahydroi-1-naphthalenesuccinic acid; and 3,3',4,4'-bicyclohexyltetracarboxylic acid dianhydride (H-BPDA); and wherein the polyimide has an optical transmittance of at least 60 percent at 400 nanometers and above.

Embodiment 2

The polyimide of embodiment 1, wherein the one or more aliphatic polyamines are selected from the group consisting of 1,2-diaminoethane (1,2-DAE); 1,3-diaminopropane (1,3-DAP); 1,4-diaminobutane (1,4-DAB); 1,5-diaminopentane (1,5-DAP); 1,6-diaminohexane (1,6-HMDA); 1,7-diaminoheptane; 1,8-diaminooctane; 1,9-diaminononane; 1,10-diaminodecane; 1,11-diaminoundecane; 1,12-diaminododecane; N-(3-aminopropyl)-1,4-butadiamine, N,N'-bis(3-aminopropyl)-1,4-butanediamine; N-(3-aminopropyl)-1,3-propanediamine; and N1-(3-(3-aminopropylamino)propyl)butane-1,4-diamine.

Embodiment 3

A polyimide derived from monomers including: one or more aliphatic polyamines; and one or more aliphatic dianhydrides or tetracarboxylic acids thereof, one or more aromatic dianhydrides or tetraacids thereof, or a mixture thereof, wherein the one or more aliphatic polyamines are selected from the group consisting of 1,2-diaminoethane (1,2-DAE); 1,5-diaminopentane (1,5-DAP); 1,6-diaminohexane (1,6-HMDA); 1,7-diaminoheptane; 1,8-diaminooctane; 1,9-diaminononane; 1,11-diaminoundecane; 1,12-diaminododecane; N-(3-aminopropyl)-1,4-butadiamine, N,N'-bis(3-aminopropyl)-1,4-butanediamine; N-(3-aminopropyl)-1,3-propanediamine; and N1-(3-(3-aminopropylamino)propyl)butane-1,4-diamine; and wherein the polyimide has an optical transmittance of at least 60 percent at 400 nanometers and above.

Embodiment 4

The polyimide of any one of embodiments 1-3, wherein the polyimide includes the one or more aromatic dianhydrides at a percentage equivalent weight that does not exceed 50 percent.

Embodiment 5

The polyimide of embodiment 4, wherein the polyimide includes the one or more aromatic dianhydrides at a percentage equivalent weight that does not exceed 40 percent.

Embodiment 6

The polyimide of embodiment 5, wherein the polyimide is fully aliphatic.

Embodiment 7

The polyimide of embodiment 6, wherein the polyimide is not derived from any aromatic dianhydrides or tetraacids thereof, and the one or more aliphatic polyamines are selected from one or more cycloaliphatic diamines selected from the group consisting of 1,4-diamino-2-methylcyclohexane; 1,4-diamino-2-ethylcyclohexane; 1,4-diamino-2-n-propylcyclohexane; 1,4-diamino-2-isobutylcyclohexane; and 1,4-diamino-2-tert-butylcyclohexane.

Embodiment 8

The polyimide of any one of embodiments 1-7, wherein the optical transmittance of the polyimide is at least 60 percent at 350 nanometers and above.

Embodiment 9

The polyimide of embodiment 8, wherein the optical transmittance of the polyimide is at least 60 percent at 290 nanometers and above.

Embodiment 10

The polyimide of any of embodiments 1, 8, or 9, wherein the optical transmittance is at least 70 percent.

Embodiment 11

The polyimide of embodiment 10, wherein the optical transmittance is at least 80 percent.

Embodiment 12

The polyimide of embodiment 11, wherein the polyimide is an amorphous polymer, crystalline polymer, or a mixture thereof.

Embodiment 13

The polyimide of any one of embodiments 1-11, wherein the one or more aromatic dianhydrides or tetraacids thereof are selected from the group consisting of 4,4'-(hexafluoroisopropylidene)diphthalic anhydride (6-FDA); 2,2',4,4'-biphenyltetracarboxylic acid dianhydride (BPDA); 2,3,3',4'-biphenyltetracarboxylic acid dianhydride (aBPDA); 3,3',4,4'-diphenylsulphonetetracaroxylic dianhydride; 3,3',4,4'diphenylpropane 2,2-tetracarboxylic dianhydride; 2,2-bis (3,4-dicarboxyphenyl)propane dianhydride; 1,4-bis(3,4-dicarboxybenzoyl)benzene dianhydride; 1,3-bis(3,4-dicarboxybenzoyl)benzene dianhydride; pyromellitic dianhydride (PMDA); 4,4'-oxydiphthalic anhydride (OPDA); benzophenone-3,3',4,4'-tetracarboxylic dianhydride (BTDA); bis(3,4-dicarboxyphenyl) thioether dianhydride; spiro bisindane dietheranhydride; bis-phenol A bisether-4-phthalic dianhydride; 1,4,5,8-naphthalenetetracraboxylic dianhydride; 2,3,6,7-naphthalenetetracraboxylic dianhydride; 3,3',4,4'-dimethyldiphenylsilanetetracarboxylic dianhydride; 3,3',4,4'-tetraphenylsilanetetracarboxylic dianhydride; p-phenylemne-bis(triphenylphthalic acid)dianhydride; and m-phenylemne-bis(triphenylphthalic acid)dianhydride.

Embodiment 14

The polyimide of any one of embodiments 1-13, wherein the polyimide is end-capped with one or more monoanhydrides and/or one or more dicarboxylic acids.

Embodiment 15

The polyimide of any one of embodiments 1-14, wherein the polyimide has a birefringence in the range of −0.002 to +0.002.

Embodiment 16

The polyimide of embodiment 15, wherein the polyimide has a birefringence in the range of −0.001 to +0.002.

Embodiment 17

The polyimide of any one of embodiments 1-16, wherein the polyimide is optically clear and perceived visually to be devoid of color.

Embodiment 18

The polyimide of any one of embodiments 1-17, wherein the polyimide has a glass transition temperature in the range of 120° C. to 220° C.

Embodiment 19

The polyimide of embodiment 18, wherein the polyimide has a glass transition temperature in the range of 130° C. to 220° C.

Embodiment 20

The polyimide of embodiment 19, wherein the polyimide has a glass transition temperature in the range of 140° C. to 200° C.

Embodiment 21

The polyimide of any one of embodiments 1-20, wherein the polyimide is soluble in a polar solvent.

Embodiment 22

The polyimide of any one of embodiments 1-21, wherein the polyimide is dissolved in a solvent to produce a solution that is processed into a material selected from the group consisting of a film, a fiber, a coating, and an adhesive.

Embodiment 23

The polyimide of embodiment 22, wherein the material is produced by a means selected from the group consisting of solution cast lines, ink jetting, dip coating, spraying, spin coating, and electrospinning.

Embodiment 24

The polyimide of any one of embodiments 1-21, wherein the polyimide is melt-processed into a material selected from the group consisting of a film, a fiber, a compounded masterbatch, and a part.

Embodiment 25

The polyimide of embodiment 24, wherein the material is produced by a means selected from the group consisting of blow molding, extrusion, pultrusion, and injection molding.

Embodiment 26

The polyimide of any one of embodiments 1-21, wherein the polyimide is solution-processed as a polyamic acid polyimide precursor to the polyimide which is then thermally converted into the polyimide.

Embodiment 27

A method of producing a polyimide according to any one of embodiments 1-26, wherein the method is selected from the group consisting of chemical imidization, thermal imidization, and solution imidization.

Embodiment 28

The method of embodiment 27, wherein the one or more aliphatic polyamines is/are chemically synthesized.

Embodiment 29

The method of embodiment 27, wherein the one or more aliphatic polyamines is/are obtained by fermentation of one or more engineered microbes selected from the group consisting of gram-positive bacteria, gram-negative bacteria, and fungi.

Embodiment 30

The method of embodiment 29, wherein the microbe includes a gram-positive bacterium.

Embodiment 31

The method of embodiment 30, wherein the gram-positive bacterium includes a bacterium of the genus *Corynebacteria*.

Embodiment 32

The method of embodiment 31, wherein the gram-positive bacterium includes a bacterium of the species *glutamicum*.

Embodiment 33

The method of embodiment 29, wherein the microbe includes a fungus.

Embodiment 34

The method of embodiment 33, wherein the fungus includes a yeast.

Embodiment 35

The method of embodiment 34, wherein the yeast includes a yeast of the genus *Saccharomyces*.

Embodiment 36

The method of embodiment 35, wherein the yeast includes a yeast of the species *cerevisiae*.

Embodiment 37

A material or article including the polyimide of any one of embodiments 1-26.

Embodiment 38

The material or article of embodiment 37, wherein the polyimide is a transparent substrate for a UV-cured coating or adhesive.

Embodiment 39

The material or article of embodiment 38, wherein the material or article is coated with the polyimide and the material or article is a material or article with electronic, aerospace, automotive, architectural, industrial, or civil engineering application.

Embodiment 40

The material or article of embodiment 37, wherein the material or article is a microelectronic component.

Embodiment 41

The material of embodiment 37, wherein the material or article is a consumer electronic device.

Embodiment 42

The material or article of embodiment 37, wherein the material or article is an electronic display.

Embodiment 43

The material or article of embodiment 37, wherein the material or article is a display, and the polyimide is a transparent base material in the display.

Embodiment 44

The material or article of embodiment 37, wherein the material or article is a solar cell, and the polyimide is a transparent substrate in the solar cell.

Embodiment 45

The material or article of embodiment 37, wherein the material or article is a flexible circuit or a wearable electronic device.

Embodiment 46

The material or article of embodiment 37, wherein the material or article further includes a gas barrier layer that acts as a barrier to water vapor and/or oxygen.

Embodiment 47

The material or article of embodiment 37, wherein the material or article is a display selected from the group consisting of a liquid crystal display, an electroluminescent display, and organic light emitting diode, and electronic paper.

Embodiment 48

The material or article of embodiment 37, wherein the material is a film with a thickness between 10 nanometers and 1 cm.

DETAILED DESCRIPTION

Figure 1:
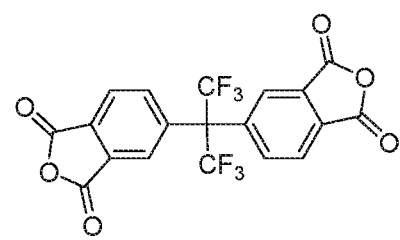
FIG. 1. 4,4'-Hexafluoroisopropylidenebisphthalic dianhydride (6FDA).
Figure 2:
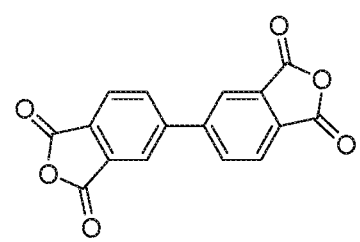
FIG. 2. 3,3',4,4'-Biphenyltetracarboxylic dianhydride (BPDA).
Figure 3:
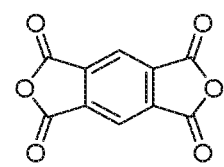
FIG. 3. Pyromellitic Dianhydride (PMDA).
Figure 4:
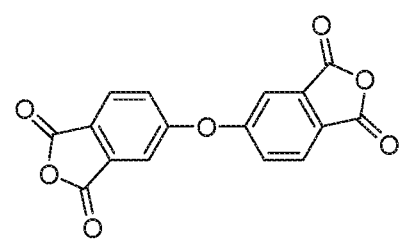
FIG. 4. 4,4'-Oxydiphthalic Anhydride (ODPA).
Figure 5:
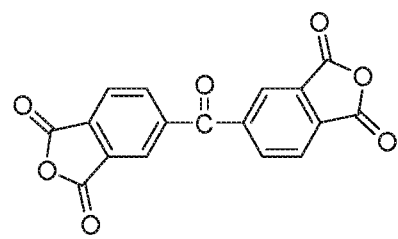
FIG. 5. 3,3,4,4-Benzophenonetetracarboxylic dianhydride (BTDA).
Figure 6:
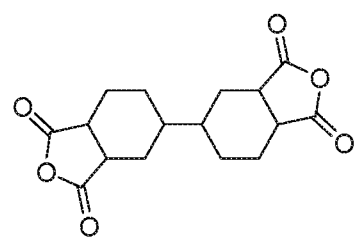
FIG. 6. 3,3',4,4'-Bicyclohexyltetracarboxylic acid dianhydride (H-BPDA).
Figure 7:
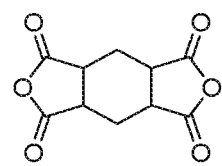
FIG. 7. 1,2,4,5-Cyclohexanetetracarboxylic dianhydride (H-PMDA).
Figure 8:
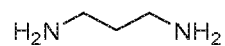
FIG. 8. 1,3-Diaminopropane.
Figure 9:
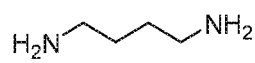
FIG. 9. 1,4-Diaminobutane.
Figure 10:
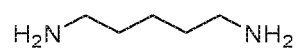
FIG. 10. 1,5-Diaminopentane.
Figure 11:
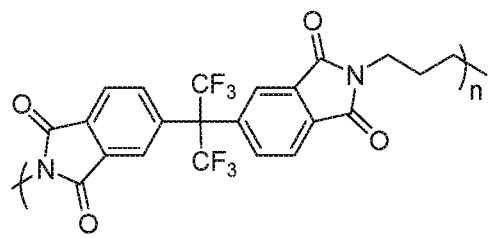
FIG. 11. Polyimide based on 6FDA and 1,3-Diaminopropane.
Figure 12:
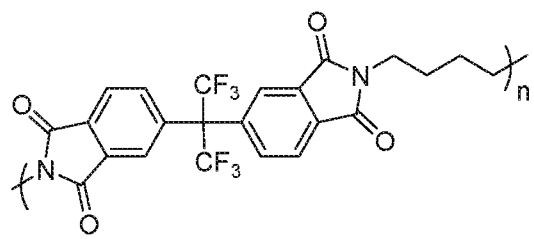
FIG. 12. Polyimide based on 6FDA and 1,4-Diaminobutane.
Figure 13:
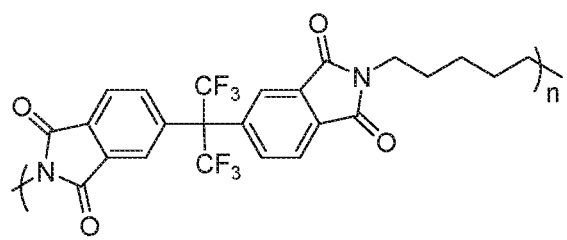
FIG. 13. Polyimide based on 6FDA and 1,5-Diaminopentane.
Figure 14:
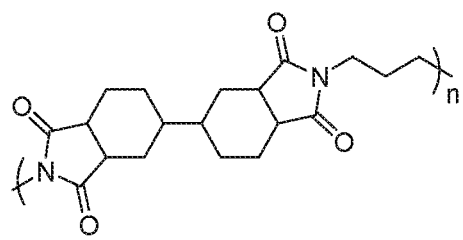
FIG. 14. Polyimide based on H-BPDA and 1,3-Diaminopropane.
Figure 15:
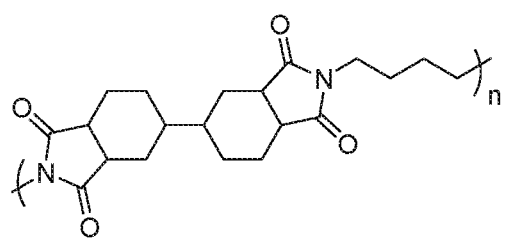
FIG. 15. Polyimide based on H-BPDA and 1,4-Diaminobutane.
Figure 16:
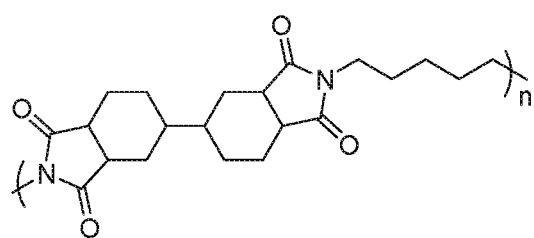
FIG. 16. Polyimide based on H-BPDA and 1,5-Diaminopentane.

This disclosure describes novel polyimides that have high aliphatic content, or are fully aliphatic, and have superior optical transparencies in the UV-Visible spectrum. This high aliphatic content improves the solubility of these polyimides and renders them solution-processable as the polyimide, eliminating the need for a post-processing, high-temperature conversions.

Definitions

Terms used in the claims and specification are defined as set forth below unless otherwise specified.

As used herein, the term "solvent" encompasses pure solvents as well as mixtures of different solvents.

The term "fermentation" is used herein to refer to a process whereby a microbial cell converts one or more substrate(s) into a desired product by means of one or more biological conversion steps, without the need for any chemical conversion step.

The term "engineered" is used herein, with reference to a cell, to indicate that the cell contains at least one genetic alteration introduced by man that distinguishes the engineered cell from the naturally occurring cell.

The term "endogenous" is used herein to refer to a cellular component, such as a polynucleotide or polypeptide, that is naturally present in a particular cell.

The term "heterologous" is used herein, with reference to a polynucleotide or polypeptide introduced into a host cell, to refer to a polynucleotide or polypeptide, respectively, derived from a different organism, species, or strain than that of the host cell. A heterologous polynucleotide or polypeptide has a sequence that is different from any sequence(s) found in the same host cell. Heterologous polynucleotides also include polynucleotides which are inserted in a different genomic location than the location at which the polynucleotide naturally exists in non-engineered forms of the host cell.

As used with reference to polypeptides, the term "wild-type" refers to any polypeptide having an amino acid sequence present in a polypeptide from a naturally occurring organism, regardless of the source of the molecule; i.e., the term "wild-type" refers to sequence characteristics, regardless of whether the molecule is purified from a natural source; expressed recombinantly, followed by purification; or synthesized. The term wild-type is also used to denote naturally occurring cells.

Enzymes are identified herein by the reactions they catalyze and, unless otherwise indicated, refer to any polypeptide capable of catalyzing the identified reaction. Unless otherwise indicated, enzymes may be derived from any organism and may have a naturally occurring or mutated amino acid sequence. As is well known, enzymes may have multiple functions and/or multiple names, sometimes depending on the source organism from which they derive. The enzyme names used herein encompass orthologs, including enzymes that may have one or more additional functions or a different name.

The term "feedback-disregulated" is used herein with reference to an enzyme that is normally negatively regulated by a downstream product of the enzymatic pathway (i.e., feedback-inhibition) in a particular cell. In this context, a "feedback-disregulated" enzyme is a form of the enzyme that is less sensitive to feedback-inhibition than the wild-type enzyme endogenous to the cell. A feedback-disregulated enzyme may be produced by introducing one or more mutations into a wild-type enzyme. Alternatively, a feedback-disregulated enzyme may simply be a heterologous, wild-type enzyme that, when introduced into a particular microbial cell, is not as sensitive to feedback-inhibition as the endogenous, wild-type enzyme. In some embodiments, the feedback-disregulated enzyme shows no feedback-inhibition in the microbial cell.

The term "sequence identity," in the context of two or more amino acid or nucleotide sequences, refers to two or more sequences that are the same or have a specified percentage of amino acid residues or nucleotides that are the same, when compared and aligned for maximum correspondence, as measured using a sequence comparison algorithm or by visual inspection.

For sequence comparison to determine percent nucleotide or amino acid sequence identity, typically one sequence acts as a "reference sequence," to which a "test" sequence is compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence relative to the reference sequence, based on the designated program parameters. Alignment of sequences for comparison can be conducted using BLAST set to default parameters.

The term "titer," as used herein, refers to the mass of a product (e.g., the molecule that microbial cells have been engineered to produce) produced by a culture of microbial cells divided by the culture volume.

As used herein with respect to recovering a molecule of interest from a cell culture, "recovering" refers to separating the molecule from at least one other component of the cell culture medium.

Polyimides

Polyimides having superior optical transparencies in the UV-Visible spectrum can be prepared from: (1) one or more aromatic dianhydrides (or tetraacids) and one or more aliphatic diamines, (2) one or more aliphatic dianhydrides (or tetracarboxylic acids) and one or more aliphatic diamines, or (3) a mixture of one or more of the two types of dianhydrides (or tetraacids or tetracarboxylic acids) and one or more aliphatic diamines to produce partially or completely aliphatic polyimides.

When the polyimide is derived from one or more aromatic dianhydrides, in various embodiments, the total content of aromatic dianhydride(s) is defined by at a percentage equivalent weight that does not exceed 50%, 45%, 40%, 35%, 30%, 25%, 20%, 15%, 10%, 5%, 4%, 3%, 2%, or 1%.

In various embodiments, such mostly or fully aliphatic polyimides have a transmittance of at least 60%, 65%, 70%, 75%, 80%, 85%, 90%, or 95% at 550 nm and above. In various embodiments, such polyimides have a transmittance of at least 60%, 65%, 70%, 75%, 80%, 85%, 90%, or 95% at 500 nm and above. In various embodiments, such polyimides have a transmittance of at least 60%, 65%, 70%, 75%, 80%, 85%, 90%, or 95% at 450 nm and above. In various embodiments, such polyimides have a transmittance of at least 60%, 65%, 70%, 75%, 80%, 85%, 90%, or 95% at 400 nm and above. In various embodiments, such polyimides have a transmittance of at least 60%, 65%, 70%, 75%, 80%, 85%, 90%, or 95% at 350 nm and above. In various embodiments, such polyimides have a transmittance of at least 60%, 65%, 70%, 75%, 80%, 85%, 90%, or 95% at 300 nm and above. In various embodiments, such polyimides have a transmittance of at least 60%, 65%, 70%, 75%, 80%, 85%, 90%, or 95% at 270 nm and above.

In various embodiments, the polyimides described herein have a birefringence in the range of: −0.005 and +0.005, −0.002 and +0.002, −0.001 and +0.002, or −0.0005 and +0.0005 (inclusive of these endpoints).

Polyimides based on aliphatic diamines with glass transition temperatures (Tgs greater than 100° C.), but with high thermal stabilities of over 400° C. can be used in the manufacture of transparent flexible substrates with near zero birefringence. In various embodiments, the Tg of the polyimides described herein is greater than 100, 125, 150, 175, 200, 225, 250, 275, 300, 325, 350, 375, or 400° C. Polyimides can also have Tgs falling within ranges bounded by any of these values. In various illustrative embodiments, the polyimides can have Tgs falling within the following ranges (including the listed endpoints): 120° C. to 220° C., 125° C. to 220° C., 130° C. to 220° C., 135° C. to 220° C., 140° C. to 200° C., 145° C. to 200° C., 150° C. to 200° C.

In certain embodiments, these polyimides are solution-processable as the polyimide.

Suitable aliphatic polyamines for use in producing the polyimides described herein include, but are not necessarily limited to, 1,2-diaminoethane (1,2-DAE), 1,3-diaminopropane (1,3-DAP), 1,4-diaminobutane (1,4-DAB), also known as putrescene, 1,5-diaminopentane (1,5-DAP), also known as cadaverine, 1,6-diaminohexane (1,6-HMDA), N-(3-aminopropyl)-1,4-butadiamine, also known as spermidine, N,N'-bis(3-aminopropyl)-1,4-butanediamine, also known as spermine, N-(3-aminopropyl)-1,3-propanediamine, also known as norspermidine, N1-(3-(3-aminopropylamino)propyl)butane-1,4-diamine, also known as thermospermine. In some embodiments, a mixture of two or more of these aliphatic polyamines, or a mixture of one or more of these polyamines with one or more other polyamines can be employed in making polyimides having the desirable properties described herein.

Clear, optically transparent, with near-zero birefringence polyimides that are solution processable as the polyimide can also be derived from cycloaliphatic diamines and aliphatic dianhydrides.

Suitable cycloaliphatic diamines for use in producing the polyimides described herein include, but are not necessarily limited to, 1,4-diamino-2-methylcyclohexane, 1,4-diamino-2-ethylcyclohexane, 1,4-diamino-2-n-propylcyclohexane, 1,4-diamino-2-isobutylcyclohexane, and 1,4-diamino-2-tert-butylcyclohexane. In some embodiments, a mixture of two or more of these cycloaliphatic diamines, or a mixture of one or more of these polyamines with one or more other polyamines (e.g., any of the aliphatic polyamines mentioned above) can be employed in making polyimides having the desirable properties described herein.

Aliphatic polyamines can be purchased, synthesized, or produced by fermentation microbes, such as gram-positive bacteria, gram-negative bacteria, and fungi (e.g., yeast).

Figure 17A:
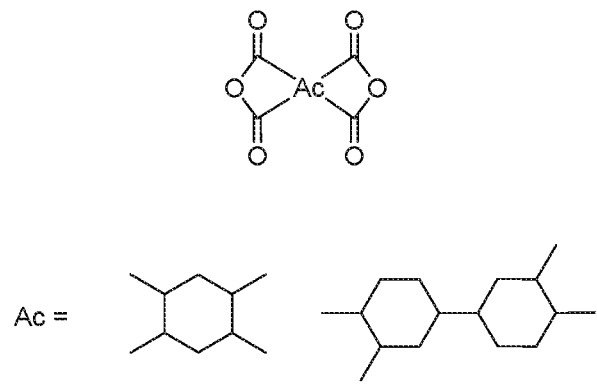
FIG. 17A-B. Illustrative dianhydrides; (A) aliphatic dianhydrides; (B) aromatic dianhydrides.

Suitable dianhydrides for use in producing the polyimides described herein include aliphatic dianhydrides and their tetracarboxylic acids, such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclobutanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 5-(2,5-dioxotetrahydrofural)-3-methyl-3-cyclohexane-1,2-dicarboxylic dianhydride, bicylo[2,2,2]-oct-7-ene-2,3-5,6-tetracarboxylic dianhydride (BODA), 1,2,4,5-cyclohexanetetracarboxylic acid dianhydride (H-PMDA), 3,4-dicarboxy-1,2,3,4-tetrahydroi-1-naphthalenesuccinic acid, 3,3',4,4'-Bicyclohexyltetracarboxylic acid dianhydride (H-BPDA), and the like. Illustrative aliphatic dianhydride structures are shown in FIG. 17A. In some embodiments, a mixture of two or more of these aliphatic dianhydrides or their tetracarboxylic acids, or a mixture of one or more of these dianhydrides with one or more other dianhydrides can be employed in making polyimides having the desirable properties described herein.

Figure 17B:
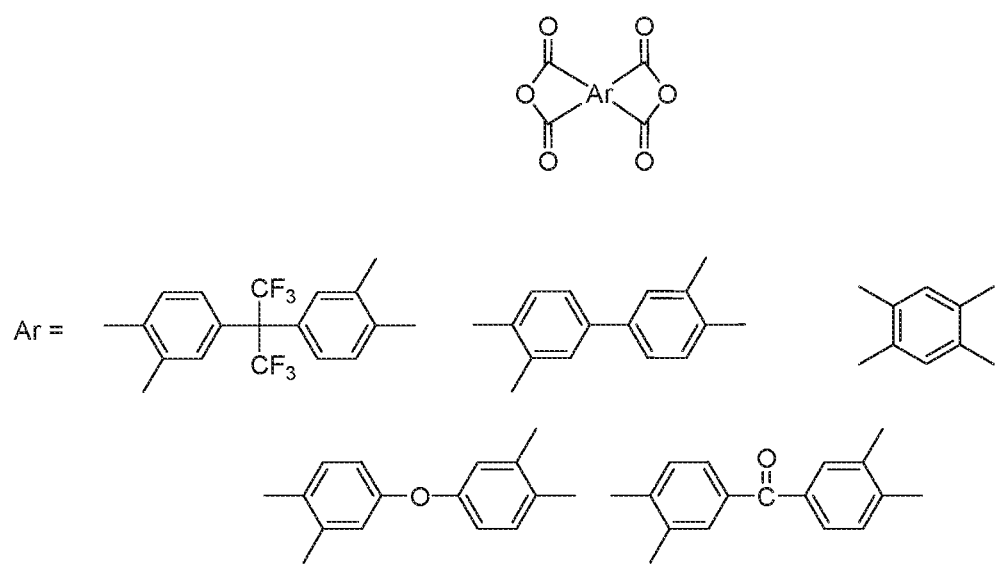
Figure 18:
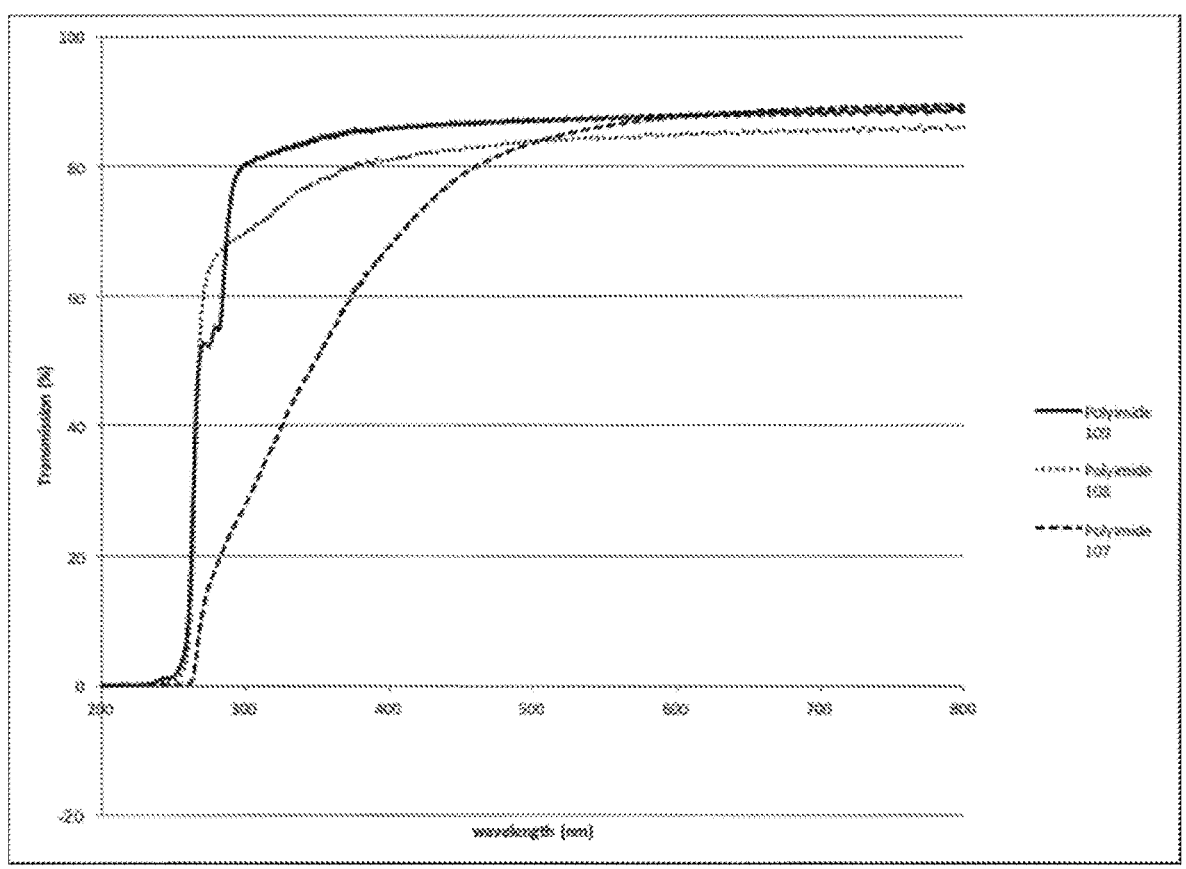
FIG. 18. Transmission spectra of polyimides.

For example, in certain embodiments, the polyimide can be derived from a mixture of aromatic and aliphatic dianhydrides (and their tetracarboxylic acids or tertaacids, respectively). Suitable aromatic dianhydrides and their tetraacids include, but are not necessarily limited to, 4,4'-(hexafluoroisopropylidene)diphthalic anhydride (6-FDA), 2,2',4,4'-biphenyltetracarboxylic acid dianhydride (BPDA), 2,3,3',4'-biphenyltetracarboxylic acid dianhydride (aBPDA), 3,3',4,4'-diphenylsulphonetetracaroxylic dianhydride, 3,3',4,4'diphenylpropane 2,2-tetracarboxylic dianhydride, 2,2-bis(3,4-dicarboxyphenyl)propane dianhydride, 1,4-bis(3,4-dicarboxybenzoyl)benzene dianhydride, 1,3-bis(3,4-dicarboxybenzoyl)benzene dianhydride, pyromellitic dianhydride (PMDA), 4,4'-oxydiphthalic anhydride (OPDA), benzophenone-3,3',4,4'-tetracarboxylic dianhydride (BTDA), bis(3,4-dicarboxyphenyl) thioether dianhydride, Spiro bisindane dietheranhydride, bis-phenol A bisether-4-phthalic dianhydride, 1,4,5,8-naphthalenetetracraboxylic dianhydride, 2,3,6,7-naphthalenetetracraboxylic dianhydride, 3,3',4,4'-dimethyldiphenylsilanetetracarboxylic dianhydride, 3,3',4,4'-tetraphenylsilanetetracarboxylic dianhydride, p-phenylemne-bis(triphenylphthalic acid)dianhydride, and m-phenylemne-bis(triphenylphthalic acid)dianhydride. (For ease of discussion, references below to the use of aromatic and aliphatic dianhydrides will be understood to apply also to their corresponding tetracarboxylic acids and tertaacids.) Illustrative aromatic dianhydride structures are shown in FIG. 17B.

Examples of polyimides having one or more of the desirable properties described herein are shown in Table 1.

TABLE 1

Combinations of amines and anhydrides, ratios shown are equivalent ratios and are based on the equivalent weight (eq. wt.) of the monomers (eq. wt. = molecular weight/functionality of the monomer)

| polyimide | Aliphatic polyamine/ aliphatic cyclodiamine | Dianhydride | Eq. ratio |
|---|---|---|---|
| 100 | 1,2-DAE | 6-FDA | 1/1 |
| 101 | 1,3-DAP | 6-FDA | 1/1 |
| 102 | 1,4-DAB | 6-FDA | 1/1 |
| 103 | 1,5-DAP | 6-FDA | 1/1 |
| 104 | 1,6-HMDA | 6-FDA | 1/1 |
| 105 | 1,2-DAE | H-BPDA | 1/1 |
| 106 | 1,3-DAP | H-BPDA | 1/1 |
| 107 | 1,4-DAB | H-BPDA | 1/1 |
| 108 | 1,5-DAP | H-BPDA | 1/1 |
| 109 | 1,6-HMDA | H-BPDA | 1/1 |
| 110 | 1,2-DAE | BODA | 1/1 |
| 111 | 1,3-DAP | BODA | 1/1 |
| 112 | 1,4-DAB | BODA | 1/1 |
| 113 | 1,5-DAP | BODA | 1/1 |
| 114 | 1,6-HMDA | BODA | 1/1 |
| 115 | 1,2-DAE | H-PMDA | 1/1 |
| 116 | 1,3-DAP | H-PMDA | 1/1 |
| 117 | 1,4-DAB | H-PMDA | 1/1 |
| 118 | 1,5-DAP | H-PMDA | 1/1 |
| 119 | 1,6-HMDA | H-PMDA | 1/1 |
| 120 | 1,2-DAE | H-BPDA/H-PMDA | 1/0.9/0.1 |
| 121 | 1,3-DAP | H-BPDA/H-PMDA | 1/0.9/0.1 |
| 122 | 1,4-DAB | H-BPDA/H-PMDA | 1/0.9/0.1 |
| 123 | 1,5-DAP | H-BPDA/H-PMDA | 1/0.9/0.1 |
| 124 | 1,6-HMDA | H-BPDA/H-PMDA | 1/0.9/0.1 |
| 125 | 1,2-DAE | BTDA | 1/1 |
| 126 | 1,3-DAP | BTDA | 1/1 |
| 127 | 1,4-DAB | BTDA | 1/1 |
| 128 | 1,5-DAP | BTDA | 1/1 |
| 129 | 1,6-HMDA | BTDA | 1/1 |
| 130 | 1,2-DAE | BTDA/H-BPDA | 1/0.8/0.2 |
| 131 | 1,3-DAP | BTDA/H-BPDA | 1/0.8/0.2 |
| 132 | 1,4-DAB | BTDA/H-BPDA | 1/0.8/0.2 |
| 133 | 1,5-DAP | BTDA/H-BPDA | 1/0.8/0.2 |
| 134 | 1,6-HMDA | BTDA/H-BPDA | 1/0.8/0.2 |
| 135 | 1,2-DAE/1,3-DAP | H-BPDA | 0.5/0.5/1 |
| 136 | 1,2-DAE/1,4-DAB | H-BPDA | 0.5/0.5/1 |
| 137 | 1,2-DAE/1,5-DAP | H-BPDA | 0.5/0.5/1 |
| 138 | 1,2-DAE/1,6-HMDA | H-BPDA | 0.5/0.5/1 |
| 139 | 1,3-DAP/1,4-DAP | H-BPDA | 0.5/0.5/1 |
| 140 | 1,3-DAP/1,5-DAP | H-BPDA | 0.5/0.5/1 |
| 141 | 1,3-DAP/1,6-HMDA | H-BPDA | 0.5/0.5/1 |
| 142 | 1,4-DAB/1,5-DAP | H-BPDA | 0.5/0.5/1 |
| 143 | 1,4-DAB/1,6-HMDA | H-BPDA | 0.5/0.5/1 |
| 144 | 1,5-DAP/1,6-HMDA | H-BPDA | 0.5/0.5/1 |
| 145 | 1,4-DACH | H-BPDA | 1/1 |
| 146 | 1,4-DACH | BODA | 1/1 |
| 147 | 1,4-DACH | H-PMDA | 1/1 |
| 148 | 1,4-DACH/1,2-DAE | H-PMDA | 0.5/0.5/1 |
| 149 | 1,4-DACH/1,3-DAP | H-PMDA | 0.5/0.5/1 |
| 150 | 1,4-DACH/1,4-DAB | H-PMDA | 0.5/0.5/1 |
| 151 | 1,4-DACH/1,5-DAP | H-PMDA | 0.5/0.5/1 |
| 152 | 1,4-DACH/1,5-HMDA | H-PMDA | 0.5/0.5/1 |
| 153 | 1,4-DACH/1,2-DAE | BPDA/H-PMDA | 0.5/0.5/0.8/0.2 |
| 154 | 1,4-DACH/1,3-DAP | BPDA/H-PMDA | 0.5/0.5/0.8/0.2 |
| 155 | 1,4-DACH/1,4-DAB | BPDA/H-PMDA | 0.5/0.5/0.8/0.2 |
| 156 | 1,4-DACH/1,5-DAP | BPDA/H-PMDA | 0.5/0.5/0.8/0.2 |
| 157 | 1,4-DACH/1,5-HMDA | BPDA/H-PMDA | 0.5/0.5/0.8/0.2 |

In certain embodiments, polyimides can be end-capped with one or more aromatic and/or aliphatic mono-anhydrides and/or dicarboxylic acids. Examples include: trans-1,2-cyclohexanedicarboxylic anhydride, trans-1,2-cyclohexanedicarboxylic acid, cis-1,2-cyclohexanecarboxylic anhydride, cis-1,2-cyclohexanecarboxylic acid, hexahydro-4-methylphthalic anhydride, a mixture of cis and trans bicyclo [2.2.2]octane-2,3-dicarboxylic anhydride, norcantharidin, phthalic anhydride, 4-methylphthalic anhydride, and 5-hydroxy-2-benzofuran-1,3-dione.

In certain embodiments (typically where the polyimide is fully aliphatic), polyimides exhibit near zero birefringence preferably in the range of −0.002 and +0.002, most preferably in the range of −0.001 and +0.001.

In certain embodiments (typically where the polyimide is fully aliphatic), polyimides are optically transparent and clear, with optical transparencies at wavelengths of 400 nm and higher, preferably of at least 60% and above, more preferably of at least 70% and above, and most preferably of at least 80% and above.

In some embodiments, polyimides have glass transition temperatures in the range of 120-220° C., more preferably in the range of 130-220° C., and most preferably in the range of 140-200° C.

In particular embodiments, polyimides described herein are soluble as the polyimide and produce polyimide solutions when polar solvents, such as, but not necessarily limited to, N-methyl-2-pyrrolidone (NMP), N,N-dimethylacetamide (DMAc), cyclopentanone, and chloroform, are used.

Methods of Producing Polyimides

Methods for producing polyimides are well known to those of skill in the art, and any method may be employed to produce the polyimides described herein, provided the resulting polyimide has at least one of the desirable properties described herein. For example, monomers can be polymerized in high boiling solvents, such as dimethylacetamide (DMAc), N-methyl-2-pyrrolidone (NMP), or m-cresol, which can contain an imidizing agent, such as isoquinoline, which, at elevated temperatures, yields the imidized polymer directly. Alternatively, monomers can be polymerized at low temperatures in polar aprotic solvents, such as DMAc or NMP below 80° C. to yield a polyamic acid that is imidized either chemically or thermally. In chemical imidization, a mixture of an imidizing catalyst, such as a tertiary amine, and a dehydrating agent such as an aliphatic anhydride are added to the polymerization solution. Typical imidizing catalysts are triethylamine, a pyridine or a pyridine derivative, or isoquinoline. A typical dehydrating agent is acetic anhydride. Imidization can also be carried out by the combination of chemical and thermal methods.

After imidization, the polyimides can be isolated by precipitation into a non-solvent such as an alcohol. Typical non-solvents used for this purpose are methanol or ethanol. After polymer isolation and drying, a film casting solution can be prepared by dissolving the polymer into a polar solvent such and DMAc, NMP, cyclopentone, or chloroform.

Fermentative Production of Molecules for Use in Producing Polyimides

The molecules from which the polyimide is derived (i.e., the monomers) can be purchased or produced by chemical synthesis or by culturing a microbe capable of producing the molecule.

Engineering for Microbial Production

In some embodiments, the microbe is one that has been engineered to produce the molecule. For example, if the microbe does not naturally produce the molecule, but produces a precursor, one or more enzymes necessary to produce the molecule can be introduced into the microbe using standard genetic engineering techniques. A microbe that produces the molecule of interest (either naturally or via genetic engineering) can be engineered to enhance production of the molecule. In some embodiments, this is achieved by increasing the activity of one or more of the enzymes in the pathway that leads to the molecule of interest. In certain embodiments, the activity of one or more upstream pathway enzymes is increased by modulating the expression or activity of the endogenous enzyme(s). Alternatively or additionally, the activity of one or more upstream pathway enzymes can be supplemented by introducing one or more of the corresponding genes into the microbial host cell. For example, the microbe can be engineered to express multiple copies of one or more of the pathway enzymes, and/or one or more pathway enzymes can be expressed from introduced genes linked to particularly strong (constitutive or inducible) promoters. An introduced pathway gene may be heterologous or may simply be an additional copy of an endogenous gene. Where a heterologous gene is used, it may be codon-optimized for expression in the particular host microbe employed.

1,4-DAB can be produced from L-ornithine. A base microbial strain for the production of 1,4-DAB can be produced by reducing the presence of native ornithine carbamoyltransferase enzyme, e.g., by knocking out one or more of the argI and argF genes. Strains with reduced production of the enzyme can be further modified to decrease the presence of an endogenous 1,4-DAB utilization pathway, an endogenous 1,4-DAB degradation pathway, or both. Decreasing the presence of the endogenous utilization pathway can be carried out by decreasing the presence of putrescine aminopropyltransferase, spermidine acetyltransferase, or both. Briefly, the presence of putrescine aminopropyltransferase can be decreased by knocking out the speE gene, and the presence of spermidine acetyltransferase can be decreased by knocking out the speG gene. A decreased presence of an endogenous 1,4-DAB degradation pathway can be obtained by knocking out puuPA genes. Modifications to further improve production of 1,4-DAB can include modifications that improve the flux from ornithine to 1,4-DAB and/or modifications that improve the flux to ornithine from cellular carbon sources like glutamate.

Microbial Host Cells

Any microbe that can be used to express introduced genes can be engineered for fermentative production of molecules as described above. In certain embodiments, the microbe is one that is naturally incapable fermentative production of the molecule of interest. In some embodiments, the microbe is one that is readily cultured, such as, for example, a microbe known to be useful as a host cell in fermentative production of molecules of interest. Bacteria cells, including gram positive or gram negative bacteria can be engineered as described above. Examples include *C. glutamicum, B. subtilis, B. licheniformis, B. lentus, B. brevis, B. stearothermophilus, B. alkalophilus, B. amyloliquefaciens, B. clausii, B. halodurans, B. megaterium, B. coagulans, B. circulans, B. lautus, B. thuringiensis, S. albus, S. lividans, S. coelicolor, S. griseus, P. citrea, Pseudomonas* sp., *P. alcaligenes, Lactobacilis* spp. (such as *L. lactis, L. plantarum*), *L. grayi, E. coli, E. faecium, E. gallinarum, E. casseliflavus*, and/or *E. faecalis* cells.

There are numerous types of anaerobic cells that can be used as microbial host cells in the methods described herein. In some embodiments, the microbial cells are obligate anaerobic cells. Obligate anaerobes typically do not grow well, if at all, in conditions where oxygen is present. It is to be understood that a small amount of oxygen may be present, that is, there is some level of tolerance level that obligate anaerobes have for a low level of oxygen. Obligate anaerobes engineered as described above can be grown under substantially oxygen-free conditions, wherein the amount of oxygen present is not harmful to the growth, maintenance, and/or fermentation of the anaerobes.

Alternatively, the microbial host cells used in the methods described herein can be facultative anaerobic cells. Facultative anaerobes can generate cellular ATP by aerobic respiration (e.g., utilization of the TCA cycle) if oxygen is present. However, facultative anaerobes can also grow in the absence of oxygen. Facultative anaerobes engineered as described above can be grown under substantially oxygen-free conditions, wherein the amount of oxygen present is not harmful to the growth, maintenance, and/or fermentation of the anaerobes, or can be alternatively grown in the presence of greater amounts of oxygen.

In some embodiments, the microbial host cells used in the methods described herein are filamentous fungal cells. (See, e.g., Berka & Barnett, Biotechnology Advances, (1989), 7(2):127-154). Examples include *Trichoderma longibrachiatum, T. viride, T. koningii, T. harzianum, Penicillium* sp., *Humicola insolens, H. lanuginose, H. grisea, Chrysosporium* sp., *C. lucknowense, Gliocladium* sp., *Aspergillus* sp. (such as *A. oryzae, A. niger, A. sojae, A. japonicus, A. nidulans*, or *A. awamori*), *Fusarium* sp. (such as *F. roseum, F. graminum F. cerealis, F. oxysporuim*, or *F. venenatum*), *Neurospora* sp. (such as *N. crassa* or *Hypocrea* sp.), *Mucor* sp. (such as *M. miehei*), *Rhizopus* sp., and *Emericella* sp. cells. In particular embodiments, the fungal cell engineered as described above is *A. nidulans, A. awamori, A. oryzae, A. aculeatus, A. niger, A. japonicus, T. reesei, T. viride, F. oxysporum*, or *F. solani*. Illustrative plasmids or plasmid components for use with such hosts include those described in U.S. Patent Pub. No. 2011/0045563.

Yeasts can also be used as the microbial host cell in the methods described herein. Examples include: *Saccharomyces* sp., *Yarrowia* sp., *Schizosaccharomyces* sp., *Pichia* sp., *Candida* sp, *Kluyveromyces* sp., and *Hansenula* sp. In some embodiments, the *Saccharomyces* sp. is *S. cerevisiae* (See, e.g., Romanos et al., Yeast, (1992), 8(6):423-488). In some embodiments, the *Yarrowia* sp. is *Y. lipolytica*. In some embodiments, the *Kluyveromyces* sp. is *K. marxianus*. In some embodiments, the *Hansenula* sp. is *H. polymorpha*. Illustrative plasmids or plasmid components for use with such hosts include those described in U.S. Pat. No. 7,659,097 and U.S. Patent Pub. No. 2011/0045563.

In some embodiments, the host cell can be an algal cell derived, e.g., from a green algae, red algae, a glaucophyte, a chlorarachniophyte, a euglenid, a chromista, or a dinoflagellate. (See, e.g., Saunders & Warmbrodt, "Gene Expression in Algae and Fungi, Including Yeast," (1993), National Agricultural Library, Beltsville, Md.). Illustrative plasmids or plasmid components for use in algal cells include those described in U.S. Patent Pub. No. 2011/0045563. In other embodiments, the host cell is a cyanobacterium, such as cyanobacterium classified into any of the following groups based on morphology: *Chlorococcales, Pleurocapsales, Oscillatoriales, Nostocales*, or *Stigonematales* (See, e.g., Lindberg et al., Metab. Eng., (2010) 12(1):70-79). Illustrative plasmids or plasmid components for use in cyanobacterial cells include those described in U.S. Patent Pub. Nos. 2010/0297749 and 2009/0282545 and in Intl. Pat. Pub. No. WO 2011/034863.

Genetic Engineering Methods

Microbial cells can be engineered through conventional techniques of molecular biology (including recombinant techniques), microbiology, cell biology, biochemistry, and immunology, which are within the skill of the art. Such techniques are explained fully in the literature, see e.g., "Molecular Cloning: A Laboratory Manual," fourth edition (Sambrook et al., 2012); "Oligonucleotide Synthesis" (M. J. Gait, ed., 1984); "Culture of Animal Cells: A Manual of Basic Technique and Specialized Applications" (R. I. Freshney, ed., 6th Edition, 2010); "Methods in Enzymology" (Academic Press, Inc.); "Current Protocols in Molecular Biology" (F. M. Ausubel et al., eds., 1987, and periodic updates); "PCR: The Polymerase Chain Reaction," (Mullis et al., eds., 1994); Singleton et al., Dictionary of Microbiology and Molecular Biology 2nd ed., J. Wiley & Sons (New York, N.Y. 1994).

Vectors are polynucleotide vehicles used to introduce genetic material into a cell. Vectors useful in the methods described herein can be linear or circular. Vectors can integrate into a target genome of a host cell or replicate independently in a host cell. For many applications, integrating vectors that produced stable transformants are preferred. Vectors can include, for example, an origin of replication, a multiple cloning site (MCS), and/or a selectable marker. An expression vector typically includes an expression cassette containing regulatory elements that facilitate expression of a polynucleotide sequence (often a coding sequence) in a particular host cell. Vectors include, but are not limited to, integrating vectors, prokaryotic plasmids, episomes, viral vectors, cosmids, and artificial chromosomes.

Illustrative regulatory elements that may be used in expression cassettes include promoters, enhancers, internal ribosomal entry sites (IRES), and other expression control elements (e.g., transcription termination signals, such as polyadenylation signals and poly-U sequences). Such regulatory elements are described, for example, in Goeddel, Gene Expression Technology: Methods In Enzymology 185, Academic Press, San Diego, Calif. (1990).

In some embodiments, vectors may be used to introduce systems that can carry out genome editing, such as CRISPR systems. See U.S. Patent Pub. No. 2014/0068797, published 6 Mar. 2014; see also Jinek M., et al., "A programmable dual-RNA-guided DNA endonuclease in adaptive bacterial immunity," Science 337:816-21, 2012). In Type II CRISPR-Cas9 systems, Cas9 is a site-directed endonuclease, namely an enzyme that is, or can be, directed to cleave a polynucleotide at a particular target sequence using two distinct endonuclease domains (HNH and RuvC/RNase H-like domains). Cas9 can be engineered to cleave DNA at any desired site because Cas9 is directed to its cleavage site by RNA. Cas9 is therefore also described as an "RNA-guided nuclease." More specifically, Cas9 becomes associated with one or more RNA molecules, which guide Cas9 to a specific polynucleotide target based on hybridization of at least a portion of the RNA molecule(s) to a specific sequence in the target polynucleotide. Ran, F. A., et al., ("In vivo genome editing using *Staphylococcus aureus* Cas9," Nature 520 (7546):186-91, 2015, Apr. 9], including all extended data) present the crRNA/tracrRNA sequences and secondary structures of eight Type II CRISPR-Cas9 systems. Cas9-like synthetic proteins are also known in the art (see U.S. Published Patent Application No. 2014-0315985, published 23 Oct. 2014).

Vectors or other polynucleotides can be introduced into microbial cells by any of a variety of standard methods, such as transformation, electroporation, nuclear microinjection, transduction, transfection (e.g., lipofection mediated or DEAE-Dextrin mediated transfection or transfection using a recombinant phage virus), incubation with calcium phosphate DNA precipitate, high velocity bombardment with DNA-coated microprojectiles, and protoplast fusion. Transformants can be selected by any method known in the art. Suitable methods for selecting transformants are described in U.S. Patent Pub. Nos. 2009/0203102, 2010/0048964, and 2010/0003716, and International Publication Nos. WO 2009/076676, WO 2010/003007, and WO 2009/132220.

Engineered Microbial Cells

The above-described methods can be used to produce engineered microbial cells that produce, and in certain embodiments, overproduce, a molecule of interest. Engineered microbial cells can have at least 1, 2, 3, 4, 5, 6,7, 8, 9, 10, or more genetic alterations, as compared to a wild-type microbial cell, such as any of the microbial host cells described herein. In some embodiments, the engineered microbial cells have not more than 15, 14, 13, 12, 11, 10, 9, 8, 7, 6, 5, or 4 genetic alterations, as compared to a wild-type microbial cell. In various embodiments, engineered microbial cells can have a number of genetic alterations falling within the any of the following illustrative ranges: 1-10, 1-9, 1-8, 2-7, 2-6, 2-5, 2-4, 2-3, 3-7, 3-6, 3-5, 3-4, etc.

The engineered microbial cells can contain introduced genes that have a wild-type nucleotide sequence or that differ from wild-type. For example, the wild-type nucleotide sequence can be codon-optimized for expression in a particular host cell. The amino acid sequences encoded by any of these introduced genes can be wild-type or can differ from wild-type. In various embodiments, the amino acid sequences have at least 0 percent, 75 percent, 80 percent, 85 percent, 90 percent, 95 percent or 100 percent amino acid sequence identity with a wild-type amino acid sequence.

In various embodiments, the engineered microbial cells are capable of producing the molecule of interest at titers of at least 4, 5, 6, 7, 8, 9, 10, 20, 30, 40, 50, 75, 100, 200, 300, 400, 500, 600, 700, 800, or 900 mg/L or at least 1, 1.5, 2, 2.5, 3, 3.5, 4, 4.5, or 5 gm/L. In various embodiments, the titer is in the range of 4 mg/L to 5 gm/L, 10 mg/L to 4 gm/L, 100 mg/L to 3 gm/L, 200 mg/L to 2 gm/L, or any range bounded by any of the values listed above.

Culturing of Engineered Microbial Cells

Any of the engineered microbial cells described herein can be cultured, e.g., for maintenance, growth, and/or production of the molecule of interest.

In some embodiments, the cultures are grown to an optical density at 600 nm of 10-500.

In various embodiments, the cultures produce the molecule of interest at titers of at least 50, 75, 100, 200, 300, 400, 500, 600, 700, 800, or 900 mg/L or at least 1, 1.5, 2, 2.5, 3, 3.5, 4, 4.5, or 5 gm/L. In various embodiments, the titer is in the range of 100 mg/L to 5 gm/L, 200 mg/L to 4 gm/L, 300 mg/L to 3 gm/L, or any range bounded by any of the values listed above.

Culture Media

Microbial cells can be cultured in a minimal medium, i.e., one containing the minimum nutrients possible for cell growth. Minimal medium typically contains: (1) a carbon source for microbial growth; (2) salts, which may depend on the particular microbial cell and growing conditions; and (3) water.

Any suitable carbon source can be used to cultivate the host cells. The term "carbon source" refers to one or more carbon-containing compounds capable of being metabolized by a microbial cell. In various embodiments, the carbon source is a carbohydrate (such as a monosaccharide, a disaccharide, an oligosaccharide, or a polysaccharide), or an invert sugar (e.g., enzymatically treated sucrose syrup). Illustrative monosaccharides include glucose (dextrose), fructose (levulose), and galactose; illustrative oligosaccharides include lactose and sucrose, and illustrative polysaccharides include starch and cellulose. Suitable sugars include $C_6$ sugars (e.g., fructose, mannose, galactose, or glucose) and $C_5$ sugars (e.g., xylose or arabinose). Other, less expensive carbon sources include sugar cane juice, beet juice, sorghum juice, and the like, any of which may, but need not be, fully or partially deionized.

The salts in a culture medium generally provide essential elements, such as magnesium, nitrogen, phosphorus, and sulfur to allow the cells to synthesize proteins and nucleic acids.

Minimal medium can be supplemented with one or more selective agents, such as antibiotics.

To produce the molecule of interest, the culture medium can include, and/or be supplemented during culture with, glucose and/or a nitrogen source such as urea, an ammonium salt, ammonia, or any combination thereof.

Culture Conditions

Materials and methods suitable for the maintenance and growth of microbial cells are well known in the art. See, for example, U.S. Pub. Nos. 2009/0203102, 2010/0003716, and 2010/0048964, and International Pub. Nos. WO 2004/033646, WO 2009/076676, WO 2009/132220, and WO 2010/003007, Manual of Methods for General Bacteriology Gerhardt et al., eds), American Society for Microbiology, Washington, D.C. (1994) or Brock in Biotechnology: A Textbook of Industrial Microbiology, Second Edition (1989) Sinauer Associates, Inc., Sunderland, Mass.

In general, cells are grown and maintained at an appropriate temperature, gas mixture, and pH (such as about 20° C. to about 37° C., about 6% to about 84% $CO_2$, and a pH between about 5 to about 9). In some embodiments, cells are grown at 35° C. In some embodiments, the pH ranges for fermentation are between about pH 5.0 to about pH 9.0 (such as about pH 6.0 to about pH 8.0 or about 6.5 to about 7.0). Cells can be grown under aerobic, anoxic, or anaerobic conditions based on the requirements of the particular cell.

Standard culture conditions and modes of fermentation, such as batch, fed-batch, or continuous fermentation that can be used are described in U.S. Publ. Nos. 2009/0203102, 2010/0003716, and 2010/0048964, and International Pub. Nos. WO 2009/076676, WO 2009/132220, and WO 2010/003007. Batch and Fed-Batch fermentations are common and well known in the art, and examples can be found in Brock, Biotechnology: A Textbook of Industrial Microbiology, Second Edition (1989) Sinauer Associates, Inc.

In some embodiments, the cells are cultured under limited sugar (e.g., glucose) conditions. In various embodiments, the amount of sugar that is added is less than or about 105% (such as about 100%, 90%, 80%, 70%, 60%, 50%, 40%, 30%, 20%, or 10%) of the amount of sugar that is consumed by the cells. In particular embodiments, the amount of sugar that is added to the culture medium is approximately the same as the amount of sugar that is consumed by the cells during a specific period of time. In some embodiments, the rate of cell growth is controlled by limiting the amount of added sugar such that the cells grow at the rate that can be supported by the amount of sugar in the cell medium. In some embodiments, sugar does not accumulate during the time the cells are cultured. In various embodiments, the cells are cultured under limited sugar conditions for greater than or about 1, 2, 3, 5, 10, 15, 20, 25, 30, 35, 40, 50, 60, or 70 hours. In various embodiments, the cells are cultured under limited sugar conditions for greater than or about 5, 10, 15, 20, 25, 30, 35, 40, 50, 60, 70, 80, 90, 95, or 100% of the total length of time the cells are cultured. While not intending to be bound by any particular theory, it is believed that limited sugar conditions can allow more favorable regulation of the cells.

In some embodiments, the cells are grown in batch culture. The cells can also be grown in fed-batch culture or in continuous culture. Additionally, the cells can be cultured in minimal medium, including, but not limited to, any of the minimal media described above. The minimal medium can be further supplemented with 1.0% (w/v) glucose (or any other six-carbon sugar) or less. Specifically, the minimal medium can be supplemented with 1% (w/v), 0.9% (w/v), 0.8% (w/v), 0.7% (w/v), 0.6% (w/v), 0.5% (w/v), 0.4% (w/v), 0.3% (w/v), 0.2% (w/v), or 0.1% (w/v) glucose. Additionally, the minimal medium can be supplemented 0.1% (w/v) or less yeast extract. Specifically, the minimal medium can be supplemented with 0.1% (w/v), 0.09% (w/v), 0.08% (w/v), 0.07% (w/v), 0.06% (w/v), 0.05% (w/v), 0.04% (w/v), 0.03% (w/v), 0.02% (w/v), or 0.01% (w/v) yeast extract. Alternatively, the minimal medium can be supplemented with 1% (w/v), 0.9% (w/v), 0.8% (w/v), 0.7% (w/v), 0.6% (w/v), 0.5% (w/v), 0.4% (w/v), 0.3% (w/v), 0.2% (w/v), or 0.1% (w/v) glucose and with 0.1% (w/v), 0.09% (w/v), 0.08% (w/v), 0.07% (w/v), 0.06% (w/v), 0.05% (w/v), 0.04% (w/v), 0.03% (w/v), 0.02% (w/v), or 0.01% (w/v) yeast extract.

Recovery of a Molecule Produced by Fermentation

The fermentation methods described herein may further include a step of recovering the molecule produced by an engineered microbial host. In some embodiments, the produced molecule contained in a so-called harvest stream is recovered/harvested from the production vessel. The harvest stream may include, for instance, cell-free or cell-containing aqueous solution coming from the production vessel, which contains the produced molecule. Cells still present in the harvest stream may be separated from the molecule by any operations known in the art, such as for instance filtration, centrifugation, decantation, membrane crossflow ultrafiltration or microfiltration, tangential flow ultrafiltration or microfiltration or dead-end filtration. After this cell separation operation, the harvest stream is essentially free of cells.

Further steps of separation and/or purification of the produced molecule from other components contained in the harvest stream, i.e., so-called downstream processing steps may optionally be carried out. These steps may include any means known to a skilled person, such as, for instance, concentration, extraction, crystallization, precipitation, adsorption, ion exchange, chromatography, distillation, electrodialysis, bipolar membrane electrodialysis and/or reverse osmosis. Any of these procedures can be used alone or in combination to purify the produced molecule. Further purification steps can include one or more of, e.g., concentration, crystallization, precipitation, washing and drying, treatment with activated carbon, ion exchange and/or re-crystallization. The design of a suitable purification protocol may depend on the cells, the culture medium, the size of the culture, the production vessel, etc. and is within the level of skill in the art.

Polyimide-Containing Materials or Articles of Manufacture

The properties of the polyimides described herein suit them for use as or in a variety of materials or articles of manufacture.

In some embodiments, the polyimides described herein can be processed as polyimide solutions into films, fibers, coatings, and adhesives using techniques such as, but not limited to, solution cast lines, spin coating, and electrospinning.

In certain embodiments, the polyimides described herein can be melt-processed into films, fibers, compounded masterbatches, and parts, using techniques such as, but not limited to, blow molding, extrusion, pultrusion, and injection molding.

In particular embodiments, because of their optical properties, the polyimides described herein can be used as transparent substrates for UV-cured coatings and adhesives. Such coatings or adhesives can be employed, for example, in electronic, aerospace, automotive, architectural, industrial, or civil engineering applications.

In some embodiments, the polyimides described herein can be used in electronics applications, such as, but not limited to microelectronic components or electronic displays. For example, the polyimide can be used as a transparent base material in the display. In various embodiments, the polyimides can be used in waveguides, organic light emitting diodes, electronic paper, liquid crystal displays, electroluminescent display, thin film transistors, flexible electronics, wearable electronics, and as a dielectric material.

In certain embodiments, the polyimides described herein can be used in solar cells, e.g., where the polyimide is a transparent substrate in the solar cell.

In particular embodiments, the polyimides are used as, or incorporated into, a film that has a thickness between 10 nm and 1 cm (inclusive). In various embodiments, the film thickness is on the order of 10, 50, 100, 200, 300, 400, 500 600, 700, 800, or 900 nm, or 1, 10, 50, 100, 200, 300, 400, 500, 600, 700, 800, or 900 mm, or 1 cm. In some embodiments, the film thickness falls within a range bounded by any of these values, e.g., 50 nm to 900 mm, 200 nm to 700 mm, 500 nm to 500 mm (including the endpoints).

EXAMPLES

Film thermal properties. The film thermal properties were determined using a TA Instruments Q400 Thermal Mechanical Analyzer and a TA Instruments Q400 Thermal Gravinametric Analyzer.

Film birefringence. Dry polymer was dissolved in an organic solvent with solid content between 10-25%. After dissolution, the solution was cast on a glass substrate using a doctor blade. The resulting film was then dried under reduced pressure at elevated temperature. The film was removed from the glass by using steam with the film thickness approximately 20 um thick. Birefringence was determined using the freestanding film with a Metricon Prism Coupler 2010/M. The film birefringence is reported as $\Delta n = n_z - n_{x,y}$.

Film transparency. Transparency was measured on a cast film with approximate thickness of 20 um from 400 nm to 750 nm using a Shimadzu UV 2450 UV-Visible spectrophotometer. The transmittance is reported as the minimum transmittance at 400 nm.

Film mechanical properties. Tensile testing of the films was performed according to ASTM test method D882-12.

Example 1 (Polyimide 102)

This example illustrates a procedure for preparing an aromatic polyimide from an aromatic dianhydride and an aliphatic diamine by solution imidization.

Into a 3 neck 250 mL flask equipped with a nitrogen inlet, a short-path distillation head with a receiving flask and nitrogen outlet, and a mechanical stirrer, 1,4-diaminobutane (1.544 g, 17.5 mmol, 1 eq) and m-cresol (20 mL) were placed under nitrogen atmosphere for 5 minutes. 6-FDA (7.781 g, 17.5 mmol, 1 eq) was then added all at once to the flask and rinsed with m-cresol (20 mL). The mixture was stirred at room temperature for an hour then slowly heated to 180° C. and stirred for two days. After two days, the reaction was cooled and the polymer isolated by precipitation into methanol. The white fibrous polymer was washed several times with hot methanol and dried at 120° C. overnight under reduced pressure.

Example 2 (Polyimide 103)

This example illustrates a procedure for preparing an aromatic polyimide from an aromatic dianhydride and an aliphatic diamine by chemical imidization.

To a 4 neck 50 mL flask equipped with 2 stoppers, a nitrogen inlet, and a mechanical stirrer, 1,5-diaminopentane (0.57 g, 5.6 mmol, 1 eq) and DMAc (11 mL) was placed under nitrogen atmosphere and cooled in an ice water bath. 6-FDA (2.47 g, 5.6 mmol, 1 eq) was then added all at once to the flask. The mixture was allowed to warm to room temperature after addition and stirred for 20 hours. Pyridine (0.5 mL, 6.4 mmol, 1.1 eq) and acetic anhydride (1.2 mL, 9.0 mmol, 1.9 eq) were added all at once to the viscous solution and allowed to stir overnight. The viscous solution was then poured into methanol and soft polymer was soaked in methanol several more times, in which it became a hard solid. The polymer was dried in a vacuum oven over night at 100° C.

Example 3 (Polyimide 109a)

This example illustrates a procedure for preparing an aliphatic polyimide from an aliphatic dianhydride and an aliphatic diamine by solution imidization.

Into a 3 neck 100 mL flask equipped with a nitrogen inlet, a short-path distillation head with a receiving flask and nitrogen outlet, and a mechanical stirrer, 1,5-diaminopentane (1.7064 g, 17 mmol, 1 eq) and m-cresol (25 mL) was placed under nitrogen atmosphere for 5 minutes. H-BPDA (5.1183, 17 mmol, 1 eq) was then added all at once to the flask. The mixture stirred at room temperature for an hour, then slowly ramped to 200° C. to a reflux for a total of 4 hours, then refluxed for two days. The polymer was then cooled and poured into methanol and soaked several times,

Example 4 (Polyimide 109b)

This example illustrates a procedure for preparing an aliphatic polyimide from an aliphatic dianhydride and an aliphatic diamine by chemical imidization.

Into a 4 neck 50 mL flask equipped with 2 stoppers, a nitrogen inlet, and a mechanical stirrer, 1,5-diaminopentane (0.9424 g, 0.009 mol, 1 eq) and DMAc (16 mL) was placed under nitrogen atmosphere for 5 minutes. H-BPDA (2.83318 g, 0.009 mol, 1 eq) was then added all at once to the flask and rinsed with 1 mL of DMAc. The mixture stirred at room temperature for an hour, then heated to 50° C. for 1 hour. The amic acid solublized and was allowed to stir overnight. Then 10 mL of DMAc was added. Pyridine (1 mL, 10 mmol, 2 eq) and acetic anhydride (2.1 mL, 20 mmol, 4 eq) were added. The solution gelled after 30 minutes, dichloromethane (15 mL) was added to increase solubility of polyimide. The reaction mixture was then poured into 150 mL of methanol. The polymer was isolated, washed with methanol several times and dried under reduce pressure.

Example 5 (Polyimide 109)

This example illustrates a procedure for preparing an aliphatic copolyimide from two aliphatic dianhydrides and an aliphatic diamine by thermal imidization.

Into 4 neck 50 mL flask equipped with 2 stoppers, a nitrogen inlet, and a mechanical stirrer, 1,6-diaminohexane (0.6331 g, 0.0054 mol, 1 eq) and NMP (7 mL) was placed under nitrogen atmosphere for 5 minutes. H-BPDA (1.5014 g, 0.0049 mol, 0.9 eq) was then added all at once to the flask. The mixture stirred at room temperature then heated at 50° C. for 2 hours, then H-PMDA (0.1226 g, 0.00054 mol, 0.1 eq) was added and reaction flask was stirred at room temperature overnight.

To cast a film, the amic acid solution was cast onto a glass slide. The film was dried in a vacuum oven with temperatures ranging from 50° C. to 200° C. The film was soaked in water overnight to remove from the glass.

Example 6 (Polyimide 124)

Into 4 neck 50 mL flask equipped with 2 stoppers, a nitrogen inlet, and a mechanical stirrer, HMDA (0.6331 g, 0.0054 mol, 1 eq) and NMP (7 mL) was placed under nitrogen atmosphere for 5 minutes. H-BPDA (1.5014 g, 0.0049 mol, 0.9 eq) was then added all at once to the flask. The mixture stirred at room temperature then heated at 50° C. for 2 hours, then H-PMDA (0.1226 g, 0.00054 mol, 0.1 eq) was added and reaction flask was stirred at room temperature overnight.

To cast a film, the amic acid solution was cast onto a glass slide with a doctor blade (side-10). The film was dried in a vacuum oven with temperatures ranging from 50° C. to 180° C. until no solvent was visible. Then the oven was increased to 200° C., then cooled after holding temperature for one hour. The film was soaked in water overnight to remove from the glass.

Example 7 (Polyimide 129)

To a 3 neck 250-mL flask equipped with 1 stopper, a nitrogen inlet, and a mechanical stirrer, C6 (2.2651, 19 mmol, 1 eq) and DMAc (35 mL) was placed under nitrogen atmosphere and cooled in an ice water bath. BTDA (6.2836, 19 mmol, 1 eq) was then added all at once to the flask. The mixture was allowed to warm to room temperature and stirred for 16 hours, and then was heated at 80° C. for 1.5 hours. A portion of the solution (7 mL) was poured into a glass bottle, sealed and stored at 0° C. for film casting. To the remaining solution, pyridine (2.5 mL, 31 mmol, 2 eq) and acetic anhydride (5 mL, 62 mmol, 4 eq) were added to the flask and stirred overnight. The chemically imidized polymer was insoluble in the reaction mixture. Both phases were precipitated into DI water and obtained a powder.

To cast a film, the amic acid solution was cast on a glass slide with an 8-sided film applicator with side 8. The glass slide was placed in a vacuum oven at 50° C. for 30 minutes then increased to 160° C. for an hour or until dry. The glass slide was then placed into a furnace under nitrogen atmosphere and heated to 200° C. and 280° C., each for 30 minutes for thermal imidization and allowed to cool for several hours.

TABLE 2

Optical Properties of Polyimides

| Polyimide | n | $\Delta n$ | % $T_{300\,nm}$ | % $T_{350\,nm}$ | % $T_{400\,nm}$ | % $T_{550\,nm}$ |
|---|---|---|---|---|---|---|
| 100 | 1.5516 | −0.0014 | tbd | tbd | 85 | 88 |
| 101 | 1.5586 | −0.0017 | tbd | tbd | 88 | 90 |
| 102 | 1.5567 | −0.0016 | tbd | tbd | 88 | 90 |
| 103 | 1.5533 | −0.0011 | tbd | tbd | 86 | 89 |
| 104 | 1.5519 | −0.0007 | tbd | tbd | 87 | 90 |

TABLE 2-continued

Optical Properties of Polyimides

| Polyimide | n | $\Delta n$ | % $T_{300\,nm}$ | % $T_{350\,nm}$ | % $T_{400\,nm}$ | % $T_{550\,nm}$ |
|---|---|---|---|---|---|---|
| 107 | 1.5464 | 0.0003 | 28 | 50 | 79 | 88 |
| 108 | 1.5451 | 0.0002 | 69 | 77 | 87 | 89 |
| 109 | 1.5433 | 0.0001 | 80 | 84 | 74 | 80 |
| 124 | 1.5434 | 0.0006 | tbd | tbd | 80 | 90 |
| 127 | 1.6419 | −0.0016 | tbd | tbd | 52 | 87 |
| 128 | 1.6360 | −0.0016 | tbd | tbd | 17 | 75 |
| 129 | 1.6319 | 0.0002 | tbd | tbd | 40 | 76 |

TABLE 3

Thermal properties of Polyimides

| Polyimide | $T_{1\%}$ (° C.) | $T_d$ (° C.) | $T_g$ (° C.) | CTE (ppm/K) |
|---|---|---|---|---|
| 100 | 453 | 506 | 204 | 58 |
| 101 | 446 | 493 | 188 | 54 |
| 102 | 441 | 497 | 180 | 65 |
| 103 | 420 | 489 | 163 | 61 |
| 104 | 437 | 491 | 140 | 97 |
| 107 | 325 | 496 | 151 | 51 |
| 108 | 331 | 484 | 130 | 50 |
| 109 | 353 | 488 | 114 | 40 |
| 124 | 360 | 484 | 124 | 54 |
| 127 | 430 | | | |
| 128 | 403 | | | |
| 129 | 424 | | | |

$T_{1\%}$ (° C.) is the temperature at which 1% weight loss of the polyimide is observed.
$T_d$ (° C.) and is the decomposition temperature.
$T_g$ is the glass transition temperature.
CTE is the coefficient of thermal expansion.

TABLE 4

Mechanical properties of Polyimides

| Polyimide | Modulus (GPa) | Tensile strength (MPa) | Elongation at break (%) |
|---|---|---|---|
| 100 | 3.2 | 60 | 2.1 |
| 101 | 3.4 | 86 | 3.0 |
| 102 | 2.9 | 78 | 3.5 |
| 103 | 2.7 | 85 | 4.3 |
| 104 | 2.1 | 61 | 4.7 |
| 107 | 4.5 | 73 | 1.8 |
| 108 | 2.1 | 40 | 4.2 |
| 109 | 1.9 | 35 | 8 |
| 124 | 2.2 | 53 | 14 |
| 127 | 3.1 | 98 | 4.3 |
| 128 | 1.9 | 40 | 4.2 |
| 129 | 2.3 | 74 | 60 |

REFERENCES

U.S. Pub. No. 2013/0178597A1, filed Jul. 22, 2011.
U.S. Pat. No. 5,420,233 (EP575986B1), filed Jan. 15, 1993.
U.S. Pat. No. 6,790,930 (EP1260538B1).
U.S. Pat. No. 5,280,101A, filed Jan. 18, 1994.
Matthews et al., Macromolecular Research 15(2):114-128 (2007).

What is claimed is:

1. A polyimide derived from monomers comprising: one or more aliphatic polyamines; and
one or more aliphatic dianhydrides or tetracarboxylic acids thereof, one or more aromatic dianhydrides or tetraacids thereof or one or more aromatic dianhydrides or tetraacids thereof and one or more aliphatic dianhydrides or tetracarboxylic acids thereof, or a mixture thereof, wherein:

the one or more aliphatic dianhydrides or tetracarboxylic acids thereof are selected from the group consisting of 2,3,4,5-tetrahydrofurantetracarboxylic dianhydride; 5-(2,5-dioxotetrahydrofural)-3-methyl-3-cyclohexane-1,2-dicarboxylic dianhydride and 3,3',4,4'-bicyclohexyltetracarboxylic acid dianhydride (H-BPDA);

the one or more aromatic dianhydrides or tetraacids thereof are selected from the group consisting of 1,4,5,8-naphthalenetetracraboxylic dianhydride; 2,3,6,7-aphthalenetetracraboxylic dianhydride; 3,3',4,4'-dimethyldiphenylsilanetetracarboxylic dianhydride; 3,3',4,4'-tetraphenylsilanetetracarboxylic dianhydride; p-phenylene bis(triphenylphthalic acid)dianhydride; and m-phenylene-bis(triphenylphthalic acid)dianhydride; and the one or more aliphatic polyamines are selected from the group consisting of 1,2-diaminoethane (1,2-DAE); 1,3-diaminopropane (1,3-DAP); 1,4-diaminobutane (1,4-DAB); 1,5-diaminopentane (1,5-DAP); N-(3-aminopropyl)-1,4-butadiamine, N,N'-bis(3a-minopropyl)-1,4-butanediamine; N-(3-aminopropyl)-1,3-propanediamine; and N1-(3-(3-aminopropylamino)propyl)butane-1,4-diamine; and wherein the polyimide has an optical transmittance on at least 70 percent at 400 nanometers and above, wherein the total content of aromatic dianhydride(s) is defined by a percentage equivalent weight of the polyimide that does not exceed 40 percent, and wherein the polyimide has a glass transition temperature in the range of 140° C. to 200° C., and the equivalent ratio of polyamine and dianhydride is 1:1.

2. The polyimide of claim 1, wherein the optical transmittance of the polyimide is at least 80 percent at 400 nanometers and above.

3. The polyimide of claim 2, wherein the polyimide is an amorphous polymer, crystalline polymer, or a mixture thereof.

4. The polyimide of claim 1, wherein the polyimide is end-capped with one or more mono-anhydrides and/or one or more dicarboxylic acids.

5. The polyimide of claim 1, wherein the polyimide has a birefringence in the range of −0.002 to +0.002.

6. The polyimide of claim 5, wherein the polyimide has a birefringence in the range of −0.001 to +0.002.

7. The polyimide of claim 1, wherein the polyimide is optically clear and perceived visually to be devoid of color.

8. The polyimide of claim 1, wherein the polyimide is soluble in a polar solvent.

9. A polyimide-containing material comprising the polyimide of claim 1, wherein the polyimide-containing material is formed by dissolving the polyimide in a solvent to produce a solution that is processed into the polyimide-containing material selected from the group consisting of a film, a fiber, a coating, and an adhesive.

10. The polyimide-containing material of claim 9, wherein the polyimide-containing material is produced by a means selected from the group consisting of solution cast lines, ink jetting, dip coating, spraying, spin coating, and electrospinning.

11. A polyimide-containing material comprising the polyimide of claim 1, wherein the polyimide is melt-processed into the polyimide-containing material selected from the group consisting of a film, a fiber, a compounded masterbatch, and a part.

12. The polyimide-containing material of claim 11, wherein the polyimide-containing material is produced by a means selected from the group consisting of blow molding, extrusion, pultrusion, and injection molding.

13. The polyimide of claim 1, wherein the polyimide is formed by solution-processing a polyamic acid polyimide precursor and thermally treating.

* * * * *